US012791995B2

(12) United States Patent
Kretschmer

(10) Patent No.: US 12,791,995 B2
(45) Date of Patent: Nov. 10, 2026

(54) METHOD AND ASSEMBLY FOR CONFIGURING AND/OR PROGRAMMING AN INDUSTRIAL AUTOMATION COMPONENT

(71) Applicant: Siemens Aktiengesellschaft, Munich (DE)

(72) Inventor: Felix Kretschmer, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 271 days.

(21) Appl. No.: 18/832,960

(22) PCT Filed: Dec. 21, 2022

(86) PCT No.: PCT/EP2022/087177
§ 371 (c)(1),
(2) Date: Jul. 25, 2024

(87) PCT Pub. No.: WO2023/143832
PCT Pub. Date: Aug. 3, 2023

(65) Prior Publication Data

US 2025/0110464 A1 Apr. 3, 2025

(30) Foreign Application Priority Data

Jan. 26, 2022 (EP) .................................... 22153406

(51) Int. Cl.
*G05B 19/042* (2006.01)
*G05B 19/05* (2006.01)

(52) U.S. Cl.
CPC ....... *G05B 19/0426* (2013.01); *G05B 19/056* (2013.01); *G05B 2219/23288* (2013.01); *G05B 2219/23445* (2013.01)

(58) Field of Classification Search
None
See application file for complete search history.

(56) References Cited

U.S. PATENT DOCUMENTS

2012/0174122 A1 7/2012 Kydles et al.

FOREIGN PATENT DOCUMENTS

DE 102008030163 12/2009

OTHER PUBLICATIONS

PCT International Search Report and Written Opinion dated Mar. 24, 2023 based on PCT/EP2022/087177 filed Dec. 21, 2022.

*Primary Examiner* — Sean Shechtman
(74) *Attorney, Agent, or Firm* — Cozen O'Connor

(57) ABSTRACT

A method and assembly for configuring and/or programming an industrial automation component, wherein respective properties at runtime are detected and stored in a database for a plurality of possible combinations of the hardware, the operating system and/or the application program, and wherein a model is generated from the database data and/or optimized using a reinforcement learning process, where a reinforcement learning reward function used during the learning or optimization process seeks to provide an accurate prediction of the properties, the properties at runtime are then predicted for intended or possible combinations using the model compared with a specified requirement, and a suitable combination is subsequently ascertained using the comparison, and the industrial automation component is configured or programmed according to the selected combination, such that the real-time behavior is very precisely predicted such that the industrial automation component can be optimally configured or programmed.

15 Claims, 3 Drawing Sheets

METHOD AND ASSEMBLY FOR CONFIGURING AND/OR PROGRAMMING AN INDUSTRIAL AUTOMATION COMPONENT

CROSS-REFERENCE TO RELATED APPLICATIONS

This is a U.S. national stage of application No. PCT/EP2022/087177 filed 21 Dec. 2022. Priority is claimed on European Application No. 22153406.8 filed 26 Jan. 2022, the content of which is incorporated herein by reference in its entirety.

BACKGROUND OF THE INVENTION

1. Field of the Invention

The invention relates to a method an assembly for configuring and/or programming an industrial automation component.

2. Description of the Related Art

Within the domain of real-time computing, the determination of cyclical behavior during configuration of programming is essential. This particularly applies to industrial automation components, such as programmable logic controllers, motion control systems, and/or robots. The industrial automation components are normally programmed using application programs ("applications") that are executed cyclically. The cycle times of the respective application are normally fixed and it is important that the execution time of a cycle of the application program never lasts longer than the fixed cycle time.

The publication DE 10 2008 030 163 A1-Münzenberger et al., "Method for simulating embedded systems by means of an integrated simulation model for hardware and software components" shows the simulation of an "embedded system" with integrated simulation of the design of hardware and software, in which execution times are recorded during the simulation.

US Pub. No. 2012/0174122 A1-Kydles et al., "METHOD FOR TESTING THE REAL-TIME CAPABILITY OF AN OPERATING SYSTEM" discloses a method for determining the real-time behavior of a computer having an operating system with a real-time extension.

In the fields of automation technology through to mobility, jitter and cycle times in the millisecond to microsecond ranges are required for the systems used; the jitter indicates the fluctuation in cycle times.

Achieving this behavior requires a deep understanding of each module involved (software and hardware) and a holistic system analysis (of hardware revisions, simple software layers and operating systems/processes through to end-user applications or apps). This means that both the type and the implementation (version number) of the hardware platform used ("hardware"), as well as the software (firmware, operating system, application program) that is run on it, have a decisive influence on the execution time of a cycle of the application program and thus on the achievable cycle times or maximum jitter of the system. A specific cycle time and a specific (maximum) jitter can therefore only be predetermined or tested, and therefore guaranteed, for a specific combination of software and hardware with precisely specified (output) versions. If the real-time behavior cannot be accurately predicted for a particular combination or for future versions, then the systems, in particular the hardware, must be dimensioned so generously that the real-time behavior can also be guaranteed for the untested combinations.

Paradigms of this real-time computing can be found in programmable logic controllers (known as PLCs), motion control applications ("motion control"), position control systems, automation and (tele-) communications solutions and the like.

Reliability and system behavior are key to stable operation with guaranteed cycle and jitter times.

Due to the increasing trend of flexible production systems and the increased use of informational technologies (IT) in operational technology (OT), automation technology solutions are forced to increasingly adapt IT standards and implement OT solutions based on IT technologies. As a result, this also increases the need for flexible systems for real-time computing and the hybrid use of non-real-time and real-time applications on a single piece of hardware (e.g., container technologies such as those used in industrial Edge Computing, etc.). In this context, the possibility for reconfiguration is also crucial. The exchange of applications as well as regular updating are essential design principles from the field of IT. In this environment in particular, it is important that, despite the required flexibility, the real-time behavior can still be guaranteed, in particular that the required cycle times are maintained and that the occurring jitter, i.e., the extent of fluctuation in the execution time of the cycles of the respective application program, remains within predefined limits.

In particular, IT-driven real-time solutions are currently achieved and made available using an iterative approach. IT-driven solutions refer to those that particularly rely on general computer systems and networks, for example, personal computers or industrial PCs and computer networks that use the Internet Protocol (IP), in contrast to proprietary automation components such as programmable logic controllers (PLCs) and automation networks such as ProfiNET and the like.

The iterative approach takes into account all the layers from hardware to end-user software in each precisely specified version and examines and measures the entire chain (i.e., viewed in operation). This is shown in FIG. 1.

Real-time behavior is measured and taken into account in the essential factors of cycle time and jitter. The measurement is usually contrasted with a specification/request by a specific use case, which requires certain results in the times obtained, i.e., in particular, specifies a certain cycle time and a maximum tolerated jitter. Iterations are used to test and identify different factors per run, which can be set via parameters, which are therefore varied in the different runs. For example, the same operating system can be tested in different versions or the same hardware with different processor clock speeds.

Thus, each iteration optimizes the real-time behavior until the target specification is reached or the possibilities for optimization are exhausted. The latter then leads to a fresh start of the process with modified output parameters (different hardware, different operating system, etc.). Once the necessary values have been reached, the present configuration including the adjusted parameters is stored and used as a template for reproducible application.

Due to the iterative approach per use case, the procedure is time-consuming and requires an individual examination of each use case. However, due to the number of possible permutations of hardware and software and the numerous parameters that can be varied, possible it is not to test all possible configurations. A comprehensive, flexible statement (ad-hoc) about the real-time behavior (e.g., modifying software, updates, existing systems) is not possible.

SUMMARY OF THE INVENTION

In view of the foregoing, it is therefore an object of the invention to make as accurate as possible a prediction of the real-time behavior of a hardware and software combination for an industrial automation component during execution of an industrial application program, even from a limited range of tests, and thus to improve the configuration and/or programming of the industrial automation component.

These and other objects and advantages are achieved in accordance with the invention by an assembly and a method for configuring and/or programming an industrial automation component, in particular an industrial controller or an industrial communication device, where with respect to the automation component at least one specific requirement pertaining to the properties at runtime, in particular associated with real-time behavior during execution of an industrial application program, is specified, and where various possible combinations of different versions of hardware, an operating system and/or the application program are regularly available for the industrial automation component. In the method, in a first step, for a plurality of possible combinations of the hardware, each combination having a different hardware version, and/or the operating system, each combination having a different operating system version, and/or the application program, each combination having a different application program version, the respective properties at runtime are measured and stored in a database.

In a second step, a model for predicting the properties at runtime is created and/or optimized from the data of the database by means of a reinforcement learning process, where a reward function of the reinforcement learning process that is used in the learning or optimization of the model is directed towards an accurate prediction of the properties.

In a third step, the properties at runtime are predicted for a number of intended or possible combinations using the model. In a fourth step, the predictions are compared with the at least one specified requirement, and in a fifth step a suitable combination is identified using the comparison and the industrial automation component is configured or programmed according to the selected combination. In the first step, the combinations interact with at least one other simulated automation component, where a planned use case for the automation component to be configured or programmed is simulated via this simulated automation component, and where for each use case, or at least for each class of use cases, the properties at runtime are stored separately in the database and learned separately in the model. Thus, the real-time behavior can be predicted very precisely so that the automation component can be optimally configured or programmed, in particular the available computing power can be optimally utilized without needing to keep excessively large reserves available and without the risk of violating real-time requirements.

The objects and advantages are also achieved by an assembly for configuring and/or programming an industrial automation component, in particular r an industrial controller or an industrial communication device, where with respect to the automation component at least one specific requirement pertaining to the properties at runtime, in particular associated with behavior real-time during execution of an industrial application program, is specified, and where various possible combinations of different versions of hardware, an operating system and/or the application program are regularly available for the industrial automation component.

At least one test assembly is provided and configured such that, for a plurality of possible combinations of the hardware, each having a different hardware version, and/or the operating system, each having a different operating system version, and/or the application program, each having a different application program version, the respective properties at runtime are recorded and stored in a database. An analysis device is provided and configured to create and/or optimize a model for predicting the properties at runtime from the data of the database by means of a reinforcement learning process, where a reward function of the reinforcement learning process, which is used in the learning or optimization of the model, is directed towards accurately predicting the properties. Furthermore, a selection device is provided for predicting the properties at runtime for a number of intended or possible combinations using the model, where the selection device is configured to compare the predictions with the at least one specified requirement, and wherein the selection device is configured to identify a suitable combination via the comparison and to transfer information about the ascertained combination to an engineering system, i.e., a system for configuring and programming automation components. The test assembly provides that the combinations interact with at least one other simulated automation component, where a planned use case for the automation component to be configured or programmed is simulated via this other automation component, and where it is further provided that for each use case, or at least for each class of use cases, the properties at runtime are stored separately in the database and learned separately in the model. Furthermore, the assembly preferably comprises this same engineering system, where the configuration or programming of the industrial automation component according to the selected combination is provided via the engineering system. With this assembly, the advantages described with reference to the method can be achieved. The same applies to a corresponding computer program product comprising a computer program, which carries out the method in accordance with the invention or at least substantial portions thereof when executed by a processor of a computer.

Advantageously, in if multiple suitable the fifth step, combinations are identified, then a selection from these combinations is made on the basis of an additional criterion. This can be another technical criterion, such as energy efficiency. However, it can also be an economic criterion, such as hardware costs or delivery times. The information required for this purpose, for example, power consumption or prices, is advantageously automatically retrieved and evaluated from sources available online, for example, suppliers' data sheets or catalogs. Advantageously, the additional criterion is thus cost information and/or availability information at the time of a planned configuration or programming, where the price information and/or availability information are automatically retrieved from at least one inventory management system.

In a particularly advantageous embodiment, in the first step, a plurality of combinations are automatically installed and executed in a test assembly. For this purpose, it is possible to classify the various components (hardware, firmware, operating system, programs) application into different categories as such "basic", "medium", "pro", "consumer", "industrial grade" based on performance or functionality or reliability and to combine components of the same category with each other in the automatic tests in order to limit the number of combinations to be tested.

In accordance with the disclosed embodiments of the invention, in the first step the combinations interact with at least one other (preferably simulated) automation component, where a planned use case for the automation component to be configured or programmed is simulated via this (optionally simulated) automation component, and where for each use case, or at least for each class of use cases, the properties at runtime are stored separately in the database and learned separately in the model. This allows, firstly, a realistic test to be implemented by the system to be tested interacting with a realistic simulated "load" and not merely operating in idle mode. Secondly, the same application software can be used for different purposes, with each use case able to lead to a different run-time behavior. Therefore, it makes sense to record and evaluate, and later to predict, the runtime behavior for different use cases or classes of use cases separately. In this context, the use cases can also be characterized by meta-information, which is stored or jointly trained in the knowledge base, i.e., the database, together with the data generated by the tests, and where meta-information of the same data type is transmitted to the analysis device in the event of a prediction request. In the simplest case, the meta-information comprises technical boundary parameters, for example, in motion control systems the number of axes used, their maximum travel speed and the query frequency of the motion encoders used. In the first step, descriptive meta-information for a use case is therefore advantageously stored in the database, where during the third step, descriptive meta-information for an intended use case is specified for predicting the properties at runtime.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention is explained below with reference to the drawings; this is also used to explain an assembly according to the invention, in which.

DETAILED DESCRIPTION OF THE EXEMPLARY EMBODIMENT

Figure 1:
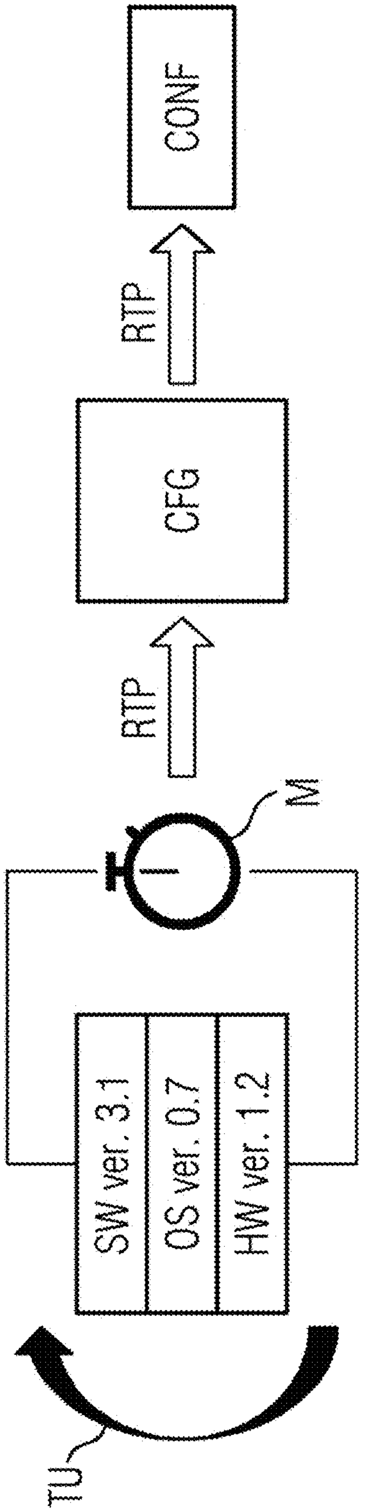
FIG 1 (Prior art)
FIG. 1 shows a schematic illustration of a method in accordance with the prior art.

FIG. 1 schematically shows a prior-art method for configuring an industrial automation component (not illustrated). Here, the different layers of the automation component are shown on the left side of the figure, namely by way of example the hardware HW, the operating system OS and the software or the application program SW. Each of these layers is identified by a unique version identifier (ver.) 1.2, 0.7, 3.1. This combination of precisely specified versions is executed in a test environment or test assembly (the test assembly may optionally also be a real operational automation system), where properties at runtime RTP (runtime properties) are recorded via a measurement M, for example, the required cycle time during the single iteration of the main cycle of the application program SW as an average value over a number of executions and the jitter as a variance of the measured execution time for the different executions of the cycles. The different executions or iterations offer the possibility for optimization TU (tuning), where different parameters can be varied. These can be clock frequencies for a communication or a processor, screen resolutions, or other settings. In the iterations, examples of the settings to be varied are the execution time (cycle time) or other properties at runtime (RTP-runtime properties), where a data set consisting of the version identifiers of the different layers of the combination of hardware and software used, together with the most suitable parameter settings in the optimization steps, is stored in a configuration database CFG (configuration). The above optimization steps for adjusting the parameters may in some cases not be sufficient to meet the target specifications for the properties at runtime. Here, for example, a piece of hardware in an improved version and/or another operating system or another version of the application program can be used. This process of optimizing then starts over until the specifications are achieved. A corresponding data set consisting of the version identifiers and the most suitable parameters is then stored, again in the configuration database CFG. To perform the configuration CONF of the automation component, a suitable combination is then selected from the configuration database CFG and the corresponding (optimized) parameters found are selected and applied to the automation component, i.e., such that the automation component to be used is configured and programmed accordingly.

Figure 2:
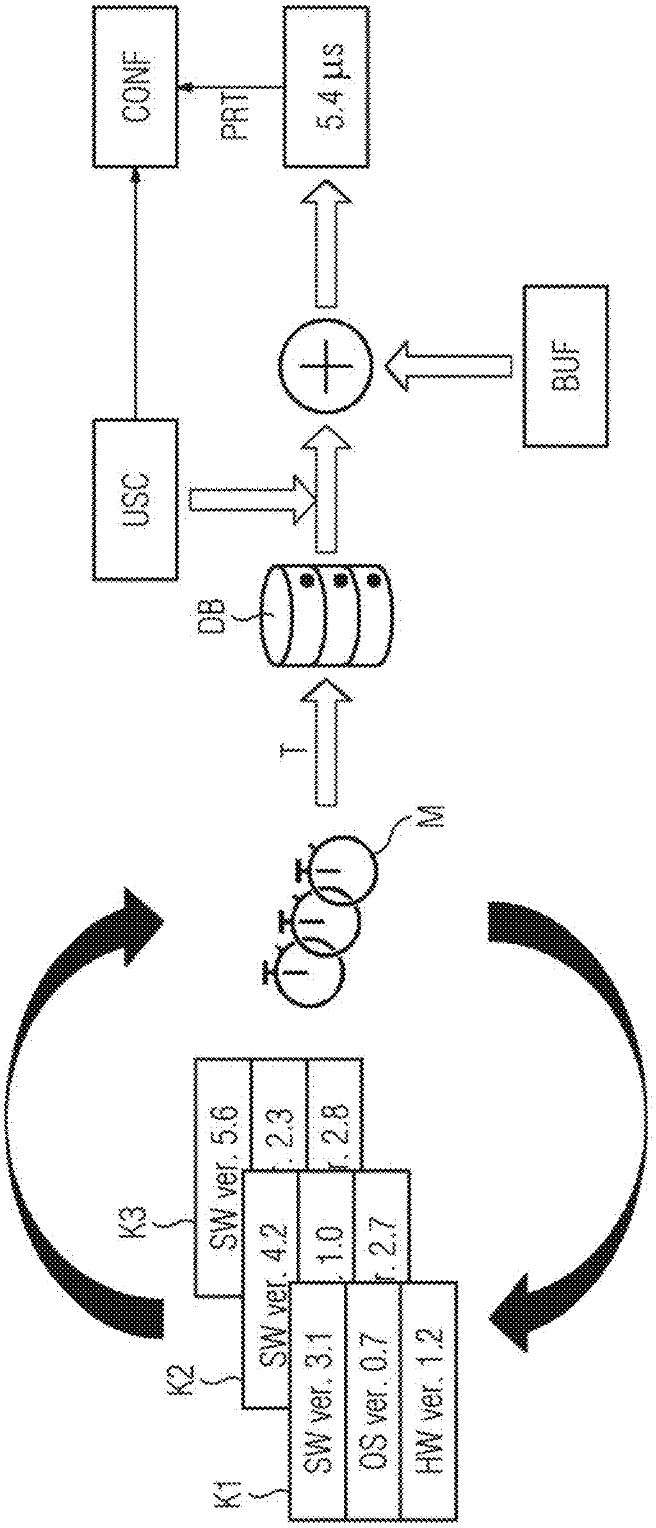
FIG. 2 shows a schematic representation of a method in accordance with the invention.

Based on this, the method in accordance with the invention is illustrated in FIG. 2. In a test assembly, a "test farm", different combinations K1, K2, K3 each consisting of a hardware platform in a specified version 1.2, 2.7, 2.8 in combination with different versions of an operating system OS 0.7, 1.0, 2.3 and an application program SW in different versions 3.1, 4.2, 5.6 are combined and executed in each case. In the present exemplary embodiment, in the first combination K1, earlier and thus "weaker" versions of the hardware, the operating system and the application program are combined with one another and in the other combinations K2, K3 respectively, more recent or more powerful versions are used, so that three combinations K1, K2, K3 with different performance levels are obtained, but which also require different outlays, in particular with regard to hardware and software costs. All three combinations K1, K2, K3 are each recorded with a number of measurements M relating to their runtime properties. As already explained in relation to FIG. 1, optimization steps can also be applied here to determine the most suitable parameters; these optimization steps are not shown in FIG. 2, however.

FIG. 2 also does not show the detailed test assembly, which can also provide the additional environment for the combinations to be tested, in particular via a simulation. Also not shown is the possibility of providing suitably configured virtual machines on a powerful base hardware platform, instead of actual different hardware versions 1.2, 2.7, 2.8, whereby the expense of the hardware to be provided for the test assembly or "test farm" can be drastically reduced.

From the information (in particular: version identifiers) of the respective combinations K1, K2, K3 and the respectively assigned results of the measurements M, a model (not shown), an artificial intelligence system, e.g., a neural network, is created, trained or retrained, which serves to determine or predict the runtime that has properties of an industrial automation component corresponding components similar to the combinations K1, K2, K3. To perform the training T of an artificial intelligence system used for the modeling, a "reinforcement learning process" is used, where for each execution of one of the combinations K1, K2, K3 the deviation between the actually measured properties at runtime with the runtime properties calculated by the model for the respective combination K1, K2, K3 are each determined, where the algorithm is more strongly rewarded in the case of a very small deviation and the model is thus progressively refined. The model and the combinations K1, K2, K3 used in the training T of the model and optionally the parameters used in the process are stored, together with the results of the measurements M and the model trained with them, in a database DB, i.e., the knowledge base.

To determine the expected properties at runtime PRT (predicted runtime properties) of a desired combination USC (user-specific configuration), a data set with the configuration of this combination, i.e., essentially with the version identifiers and other identification information for the hardware, the operating system, the application program and, if applicable, the firmware and the like, is transmitted to an analysis device, which confronts the model stored in the database DB with this information and information returns about the expected properties at runtime for this configuration OSC as a return value. In addition, the parameters determined during an optimization can be optionally returned. The specifications provided to the analysis may device also include meta-information about the planned use of the automation component, which is then correlated by the trained model with meta-information of the (simulated) use cases carried out in the tests. This increases the prediction accuracy.

The analysis device and the database DB can be configured on a common server, but a separate arrangement can also be used. It bears noting the analysis device is not shown merely for purposes of simplicity.

A surcharge is applied to the returned result for incalculable deviations by adding a safety buffer BUF (buffer of uncertainty). However, this value BUF can often turn out to be smaller than in the iterative method because of the more reliable or more precise response of the model compared to the prior art (see FIG. 1).

The result is a prediction of the expected properties at runtime PRT (prediction for runtime). A selection device (not shown) compares this value PRT with specifications for a pending task of the automation component to be configured or programmed. In particular, these specifications can consist of a maximum cycle time and a maximum jitter. These specifications usually have a technical background, for example, because of the required stability of a control algorithm, required response times or the like. If the specifications are satisfied, then the automation component can be configured or programmed according to the tested combination USC, preferably via an engineering system (not shown). If the specifications are substantially exceeded, then it is worth considering whether to use a smaller and therefore usually less expensive piece of hardware HW or a less powerful software combination of operating system, application program and, optionally, firmware. Such an alternative combination can be automatically selected and then tested using the analysis device. If the tested combination USC does not meet the specifications, then conversely another alternative combination can be automatically suggested and tested, where this alternative combination may consist of higher-cost and thus usually "faster" components. In one embodiment, the analysis device can also be confronted with the specifications and then return one or more of the tested combinations K1, K2 or K3, which come closest to meeting the specifications in terms of their runtime behavior. The system can then use these actually tested combinations K1, K2, K3 as a basis for generating a new, not yet tested combination USC, which may allow the number of iterations for finding the best-suited combination to be reduced.

The approach in accordance with the disclosed embodiments of the invention solves the problem of finding a best-suited combination of software and/or hardware for an automation component by creating and using a knowledge base for predicting real-time behavior.

For this purpose, the previous iterative approach to "tuning" (incrementally improving) a specific configuration or system is not used, but instead a plurality of variations from hardware to end-user application and possible combinations of these are measured and thus tested for their real-time behavior. The results of these measurements are stored in a global knowledge base (e.g., a merger of different databases, etc.).

If a specific configuration or a system exists for which a statement on the real-time behavior must be made, then there are two possibilities for the prediction.

In the simplest case, the present exact configuration is already known and measurements are available for exactly this configuration. A prediction is directly possible here. However, because of the large number of possible combinations, this ideal case rarely occurs.

However, if the combination under consideration has not yet been tested or "measured", a derivation must be made for the present configuration. This derivation is based on available results of comparable systems and an additional uncertainty factor that takes into account inaccuracies of the derivation. This procedure allows a prediction of the real-time behavior, in particular for flexible systems (e.g., container environments such as industrial or virtualization edge computing, environments with flexible instances and regularly changing applications).

The disadvantages of this approach (in particular due to the comparatively large uncertainty factor) lie in the "discarded" values in the real-time behavior. The approach therefore offers hardly any way to optimize a system up to the last possible value for real time operation, but on the other hand offers low-cost predictions for highly flexible environments. Due to its principle of operation, the procedure involves a large number of combinations that must be set up and tested. In order to set a restriction here or to improve the prediction at least for certain groups, a reduction in recorded/supported hardware can be included (e.g., only record and make predictions for industrial-grade hardware). It is also possible to compile only those system components (hardware, software) that are currently deliverable, which meet certain price expectations or that are to be preferred for other reasons, including technical ones (e.g. compliance with safety regulations or the like). The compilations can also be created and tested automatically by accessing inventory management systems or supplier databases.

The quality of the prediction can also be significantly improved by two options.

On the one hand, it is possible to use dedicated test farms with which the already mentioned partial or fully automatic test of various combinations can be implemented. By providing dedicated resources (different systems+combination of software and applications), separate test measurements can be performed and stored in the knowledge base. As the size (number) of systems in the test farm increases, the knowledge/experience of real-time behavior also improves, resulting in an improved model and thus improved prediction quality for user-specific systems.

On the other hand, the use in accordance with the disclosed embodiments of the invention of reinforcement learning enables a substantial improvement in the prediction accuracy. This machine learning method enables targeted predictions to be achieved with good real-time behavior. For this purpose, an algorithm is rewarded and thus enhanced or optimized during learning, which achieves particularly precise predictive accuracy by using particularly good real-time behavior through certain combinations in systems or the optimized parameterization of system settings (e.g. kernel options, resource distribution, etc.).

FIG. 2 illustrates the process (similar to the previous procedure). The "parenthesis" for the measurement and testing is placed over many or all possible combinations of hardware to software (test farm and/or systems in the field) and the results are stored in the global knowledge base.

This knowledge is used when a user-specific configuration exists in order to use the results of identical or comparable configurations to reduce uncertainty and thus to make an accurate prediction. The trained "algorithm" of the model is clearly superior to classical interpolation.

The main difference compared to the prior art lies in the approach of making a statement about the real-time behavior. The previous iterative approach brings the advantages of a test iterated multiple times and the optimization to the maximum possible conclusion.

The advantage of the new solution lies in its flexible applicability to new infrastructures (e.g., container or virtualization environments) as well as in the possibility of a direct prediction without having to submit a configuration to an iterative test process.

It is therefore also possible to introduce real-time applications retrospectively to existing systems (brownfield) and to make a prediction about the possible real-time behavior. This enables the user to use real-time in a flexible way and to make significantly better use of resources. As a result, an automation component can be configured and/or programmed in a suitable, and above all optimized manner. Under-dimensioning is reliably prevented and as a result, overdimensioning becomes obsolete as far as possible.

Figure 3:
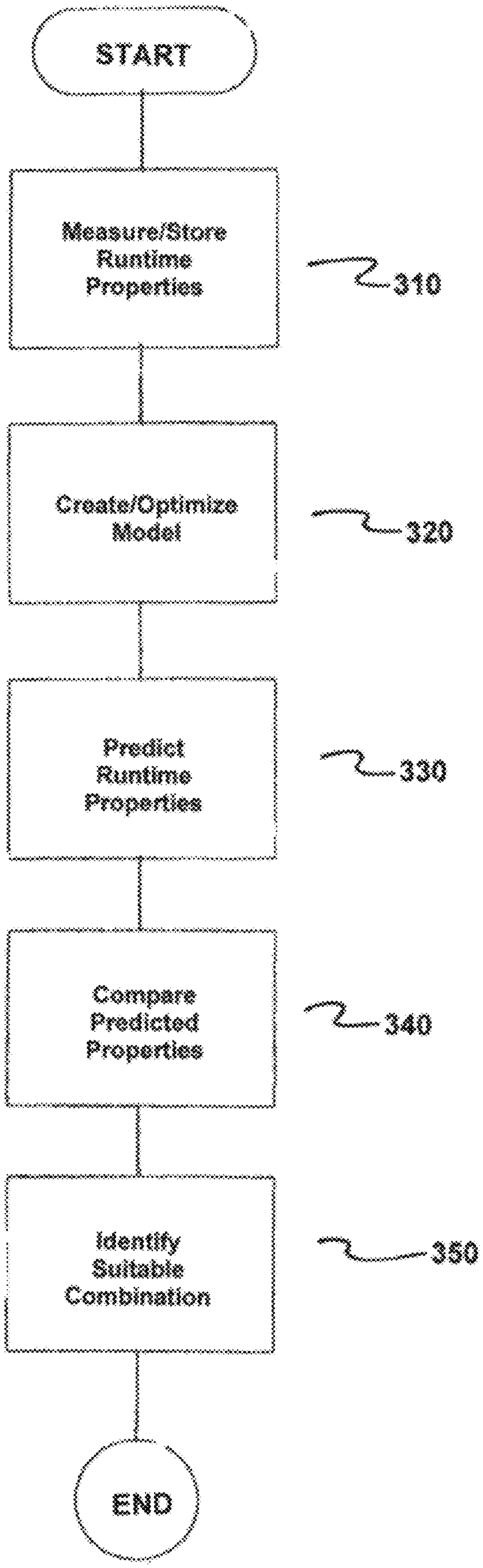
FIG. 3 is a flowchart of the method in accordance with the invention.

FIG. 3 is a flowchart of the method for configuring and/or programming an industrial automation component, where at least one specific requirement with respect to runtime properties associated with real-time behavior during execution of an industrial application program is specified with respect to the industrial automation component, and where various possible combinations K1, K2, K3 from different versions of either hardware, the operating system and the industrial application program are regularly available for the industrial automation component.

The method comprises measuring M and storing in a database DB respective properties at runtime, for a plurality of the possible combinations K1, K2, K3 of at least one the hardware, the operating system and the application program, each combination of the hardware having a different application program version, as indicated in step 310. Here, each combination of the operating system has a different operating system version and each combination of the application program has a different application program version.

Next, a model for predicting the properties at runtime PRT is created and/or optimized T from the data of the database DB via a reinforcement learning process, as indicated in step 320. Here, a reward function of the reinforcement learning process that is utilized in the learning or optimization T of the model is directed towards an accurate prediction of the properties.

Next, the properties at runtime PRT are predicted for a number of intended or possible combinations USC utilizing the model, as indicated in step 330.

Next, the predicted properties at runtime PRT are compared with the at least one specific requirement, as indicated in step 340.

Next, a suitable combination USC is identified using the comparison and the industrial automation component is configured or programmed according to the selected combination USC, as indicated in step 350.

In accordance with the method, during the measuring M and storing (step 310), the various possible combinations K1, K2, K3 interact with at least one other simulated industrial automation component. In addition, a planned use case for the industrial automation component to be configured or programmed is simulated via the at least one other simulated industrial automation component. Moreover, for each use case, or at least for each class of use cases, the properties at runtime are stored separately in the database and learned separately in the model.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring and/or programming an industrial automation component, at least one specific requirement with respect to runtime properties associated with real-time behavior during execution of an industrial application program being specified with respect to the industrial automation component, and various possible combinations from different versions of at least one of hardware, an operating system and the industrial application program being regularly available for the industrial automation component, the method comprising:

measuring and storing in a database respective properties at runtime, for a plurality of the possible combinations of at least one the hardware, the operating system and the industrial application program, each combination of the hardware having a different application program version, each combination of the operating system having a different operating system version and each combination of the industrial application program having a different application program version;

at least one of creating and optimizing a model for predicting the properties at runtime from the data of the database via a reinforcement learning process, a reward function of the reinforcement learning process which is utilized in the learning or optimization of the model being directed towards an accurate prediction of the properties;

predicting the properties at runtime for a number of intended or possible combinations utilizing the model;

comparing the predicted properties at runtime with the at least one specific requirement; and identifying a suitable combination utilizing the comparison and configuring or programming the industrial automation component according to the selected combination;

wherein during said measuring and storing the various possible combinations interact with at least one other simulated industrial automation component;

wherein a planned use case for the industrial automation component to be configured or programmed is simulated via the at least one other simulated industrial automation component; and wherein for each use case, or at least for each class of use cases, the properties at runtime are stored separately in the database and learned separately in the model.

2. The method as claimed in claim 1, wherein during said identifying a suitable combination the fifth step a selection from these combinations is made based on an additional criterion, if multiple suitable combinations are identified.

3. The method as claimed in claim 2, wherein the additional criterion is at least one of cost information and availability information at a time of a planned configuration or programming; and wherein at least one of the cost information and availability information are automatically retrieved from at least one inventory management system.

4. The method as claimed in claim 1, wherein during said measuring and storing a plurality of combinations are automatically installed and executed in a test assembly.

5. The method as claimed in claim 1, wherein during said measuring and storing descriptive meta-information for a use case is stored in the database; and wherein during said in predicting the properties at runtime descriptive meta-information for an intended use case is specified for predicting the properties at runtime.

6. The method as claimed in claim 1, wherein the industrial automation component comprises an industrial controller or an industrial communication device.

7. An assembly for configuring and/or programming an industrial automation component, at least one specific requirement with respect to runtime properties associated with real-time behavior during execution of an industrial application program being specified with respect to the industrial automation component, and various possible combinations from different versions of at least one of hardware, an operating system and the industrial application program being regularly available for the industrial automation component, the assembly comprising:

at least one test assembly configured such that, for a plurality of possible combinations of at least one the hardware, the operating system and the industrial application program, respective properties at runtime are recorded and stored in a database, each combination of the hardware having a different application program version, each combination of the operating system having a different operating system version and each combination of the industrial application program having a different application program version;

an analysis device configured to at least one of create and optimize a model for predicting the properties at runtime from the data of the database via a reinforcement learning process, a reward function of the reinforcement learning process, which is used in the learning or optimization of the model, being directed towards accurately predicting the properties;

a selection device for predicting the properties at runtime for a number of intended or possible combinations utilizing the model, the selection device being configured to compare the predictions with the at least one specific requirement, the selection device being configured to identify a suitable combination via the comparison and to transfer information about the ascertained combination to an engineering system;

wherein the configuration or programming of the industrial automation component according to the selected combination is provided via the engineering system;

wherein the test assembly ensure that the combinations interact with at least one other industrial automation component;

wherein a planned use case for the industrial automation component to be configured or programmed is simulated by the at least one other industrial automation component; and wherein for each use case, or at least for each class of use cases, the properties at runtime are stored separately in the database and learned separately in the model.

8. The assembly as claimed in claim 7, wherein the selection device is configured to select one of these combinations based on an additional criterion if multiple suitable combinations are identified.

9. The assembly as claimed in claim 8, wherein the additional criterion is at least one of cost information and availability information at the time of a planned configuration or programming; and wherein the selection device automatically retrieves at least one of the cost information and availability information from at least one inventory management system.

10. The assembly as claimed in claim 7, wherein automatic installation and execution of a plurality of combinations occurs in the test assembly.

11. The assembly as claimed in claim 8, wherein automatic installation and execution of a plurality of combinations occurs in the test assembly.

12. The assembly as claimed in claim 9, wherein automatic installation and execution of a plurality of combinations occurs in the test assembly.

13. The assembly as claimed in claim 7, wherein descriptive meta-information for each tested or simulated use case is stored in the database; and wherein descriptive meta-information for an intended use case is specified for predicting the properties at runtime.

14. The assembly as claimed in claim 7, wherein the industrial automation component comprises an industrial controller or an industrial communication device.

15. A non-transitory computer readable medium encoded with a computer program which, when executed by a processor of a computer, causes configuration and/or programming of an industrial automation component, the computer program comprising:

program code for measuring and storing in a database respective properties at runtime, for a plurality of possible combinations of at least one of hardware, an operating system and an industrial application program, each combination of the hardware having a different application program version, each combination of the operating system having a different operating system version and each combination of the industrial application program having a different application program version;

program code for at least one of creating and optimizing a model for predicting the properties at runtime from the data of the database via a reinforcement learning process, a reward function of the reinforcement learning process which is utilized in the learning or optimization of the model being directed towards an accurate prediction of the properties;

program code for predicting the properties at runtime for a number of intended or possible combinations utilizing the model;

program code for comparing the predicted properties at runtime with the at least one specific requirement; and program code for identifying a suitable combination utilizing the comparison and configuring or programming the industrial automation component according to the selected combination;

wherein during said measuring and storing the various possible combinations interact with at least one other simulated industrial automation component;

wherein a planned use case for the industrial automation component to be configured or programmed is simulated via the at least one other simulated industrial automation component; and wherein for each use case, or at least for each class of use cases, the properties at runtime are stored separately in the database and learned separately in the model.

* * * * *